(12) United States Patent
Ben-Artzi et al.

(10) Patent No.: US 8,543,577 B1
(45) Date of Patent: Sep. 24, 2013

(54) CROSS-CHANNEL CLUSTERS OF INFORMATION

(75) Inventors: Aner Ben-Artzi, Los Angeles, CA (US); Kirill Buryak, Sunnyvale, CA (US); Glenn M. Lewis, Costa Mesa, CA (US); Jun Peng, San Ramon, CA (US); Nadav Benbarak, Mountain View, CA (US)

(73) Assignee: Google Inc., Mountain View, CA (US)

( * ) Notice: Subject to any disclaimer, the term of this patent is extended or adjusted under 35 U.S.C. 154(b) by 252 days.

(21) Appl. No.: 13/038,835

(22) Filed: Mar. 2, 2011

(51) Int. Cl.
*G06F 7/00* (2006.01)
*G06F 17/30* (2006.01)

(52) U.S. Cl.
USPC .......................................................... 707/738

(58) Field of Classification Search
None
See application file for complete search history.

(56) References Cited

U.S. PATENT DOCUMENTS

| | | | |
|---|---|---|---|
| 5,321,833 A | 6/1994 | Chang et al. | |
| 5,488,725 A | 1/1996 | Turtle et al. | |
| 5,724,567 A | 3/1998 | Rose et al. | |
| 5,748,954 A | 5/1998 | Mauldin | |
| 5,873,056 A | 2/1999 | Liddy et al. | |
| 5,893,092 A | 4/1999 | Driscoll | |
| 5,963,940 A | 10/1999 | Liddy et al. | |
| 6,038,561 A | 3/2000 | Snyder et al. | |
| 6,078,914 A | 6/2000 | Redfern | |
| 6,144,944 A | 11/2000 | Kurtzman, II et al. | |
| 6,161,084 A | 12/2000 | Messerly et al. | |
| 6,181,817 B1 | 1/2001 | Zabih et al. | |
| 6,236,768 B1 | 5/2001 | Rhodes et al. | |
| 6,363,378 B1 | 3/2002 | Conklin et al. | |
| 6,385,592 B1 | 5/2002 | Angles et al. | |
| 6,460,029 B1 | 10/2002 | Fries et al. | |
| 6,477,551 B1 * | 11/2002 | Johnson et al. | 715/202 |
| 6,493,702 B1 | 12/2002 | Adar et al. | |
| 6,513,031 B1 | 1/2003 | Fries et al. | |
| 6,519,586 B2 | 2/2003 | Anick et al. | |
| 6,546,386 B1 | 4/2003 | Black et al. | |
| 6,615,209 B1 | 9/2003 | Gomes et al. | |
| 6,636,848 B1 | 10/2003 | Aridor et al. | |
| 6,778,979 B2 | 8/2004 | Grefenstette et al. | |
| 6,947,920 B2 | 9/2005 | Alpha | |
| 7,047,242 B1 | 5/2006 | Ponte | |
| 7,089,236 B1 | 8/2006 | Stibel | |
| 7,225,180 B2 | 5/2007 | Donaldson et al. | |
| 2002/0052898 A1 | 5/2002 | Schilit et al. | |
| 2002/0147738 A1 | 10/2002 | Reader | |

(Continued)

FOREIGN PATENT DOCUMENTS

WO    WO 01/44992    6/2001

OTHER PUBLICATIONS

Matsumoto et al, "Fuzzy Clustering and Relevance Ranking of Web Search Results with Differentiating Cluster Label Generation", IEEE 2010, 8 pages.*

(Continued)

*Primary Examiner* — Uyen Le
(74) *Attorney, Agent, or Firm* — Fish & Richardson P.C.

(57) ABSTRACT

A computer-implemented method includes receiving, by one or more computer systems, first information from a first channel and second information from a second channel; merging the first information with the second information; applying an unsupervised clustering model to the merged information; and generating, based on results of the applying, a cross-channel cluster, the cross-channel cluster including (i) a portion of the first information associated with a subject matter, and (ii) a portion of the second information associated with the subject matter.

20 Claims, 6 Drawing Sheets

(56) References Cited

U.S. PATENT DOCUMENTS

| | | | |
|---|---|---|---|
| 2003/0014405 A1 | 1/2003 | Shapiro et al. | |
| 2007/0239734 A1* | 10/2007 | Arellanes et al. | 707/10 |
| 2008/0168056 A1* | 7/2008 | Bluvband et al. | 707/5 |
| 2009/0016611 A1* | 1/2009 | Campbell | 382/199 |
| 2011/0137883 A1* | 6/2011 | Lagad et al. | 707/707 |
| 2012/0011124 A1* | 1/2012 | Bellegarda | 707/739 |

OTHER PUBLICATIONS

Deschacht et al, "Semi-supervised Semantic Role Labeling Using the Latent Words Language Model", Proceedings of the 2009 Conference on Empirical Methods in Natural Language Processing, Singapore Aug. 6-7, 2009, 9 pages.*

Jay Budzik et al., "Anticipating Information Needs: Everyday Applications as Interfaces to Internet Information Resources," *Intelligent Information Laboratory, Department of Computer Science, The University of Chicago*.

Jay Budzik et al., "Q&A: A system for the Capture, Organization and Reuse of Expertise," *Proceedings of the Sixty-second Annual Meeting of the American Society for Information Science*, 1999.

Jay Budzik et al., "User Interactions with Everyday Applications as Context for Just-in-time Information Access," *Intelligent Information Laboratory, Northwestern University*.

Jay Budzik et al., "Watson: Anticipating and Contextual izing Information Needs," *Proceedings of the Sixty-second Annual Meeting of the American Society for Information Science*, 1999.

Soumen Chakrabarti et al., "Scalable feature selection, classification and signature generation for organizing large text databases into hierarchical topic taxonomies," *The VLDB Journal 7*:pp. 163-178, 1998.

Liren Chen et al., "WebMate: A Personal Agent for Browsing and Searching," *The Robotics Institute, Carnegie Mellon University*, pp. 1-16, Sep. 30, 1997.

Natalie Glance et al., "Knowledge Pump: Community-centered Collaborative Filtering," *Xerox Research Centre Europe, Grenoble Laboratory*, pp. 1-5, Oct. 27, 1997.

Eric J. Glover, "Architecture of a Metasearch Engine that Supports User Information Needs," *NEC Research Institute & Artificial Intelligence Laboratory*, pp. 210-216, 1999.

Martin S. Lacher et al., "An Agent-based Knowledge Management Framework," *American Association for Artificial Intelligence*, 1999.

Steve Lawrence, "Context in Web Search," *NEC Research Institute*, pp. 1-8.

Henry Lieberman, "Letizia: An Agent That Assists Web Browsing," *AAAI Technical Report FS-95-03*, pp. 97-102, 1995.

Hisuo Mase, "Experimental Simulation for Automatic Patent Categorization," *Advances in Production Management Systems*, pp. 377-382, 1996.

Michael Pazzani, "Syskill & Webert: Identifying interesting web sites," *AAAI-96 Proceedings*, pp. 54-61, 1996.

Bradley J. Rhodes, "Margin Notes Building a Contextually Aware Associative Memory," *The Proceedings of the International Conference on Intelligent User Interfaces (IUI '00)*, pp. 1-10, Jan. 9-12, 2000.

Gerard Salton et al., "Term Weighting Approaches in Automatic Text Retrieval," *Department of Computer Science, Cornell University*, pp. 1-21, Nov. 1987.

Ron Weiss, "HyPursuit: A Hierarchical Network Search Engine that Exploits Content-Link Hypertext Clustering," *ACM*, pp. 180-193, 1996.

Xerox Research Centre Europe, "Knowledge Pump," *Xerox Corporation*, 2010.

N. Yoden, "Text Retrieval Using Linguistic Information," *International Symposium "Info-Tech '94"*, pp. 138-146, 1994.

http://www.almaden.ibm.com/projects/clever.shtml , "Clever," *IBM Almaden Research Center*.

U.S. Patent No. 6,778,979, Office Action, dated Dec. 23, 2002.

U.S. Patent No. 6,778,979, Reply to Office Action dated Dec. 23, 2002, filed on Mar. 24, 2003.

U.S. Patent No. 6,778,979, Office Action, dated Jun. 6, 2003.

U.S. Patent No. 6,778,979, Reply to Office Action dated Jun. 6, 2003, filed on Sep. 8, 2003.

U.S. Patent No. 6,778,979, Office Action, dated Nov. 21, 2003.

U.S. Patent No. 6,778,979, Reply to Office Action dated Nov. 21, 2003, filed on Jan. 23, 2004.

U.S. Patent No. 6,778,979, Appeal Brief, filed on Apr. 23, 2004.

Corrected Request for Inter Partes Reexamination of U.S. Patent No. 6,778,979, assigned control No. 95/001,430, filed Sep. 8, 2010.

Appendices M-Z for Corrected Request for Inter Partes Reexamination of U.S. Patent No. 6,778,979, assigned control No. 95/001,430, filed Sep. 8, 2010.

Reexam Litigation Search Report submitted for control No. 95/001,430, entitled "Litigation Search Report CRU 3999," filed on Sep. 9, 2010.

* cited by examiner

CROSS-CHANNEL CLUSTERS OF INFORMATION

TECHNICAL FIELD

This disclosure relates generally to generating cross-channel clusters generated from information associated with different channels.

BACKGROUND

Support centers receive large amounts of documents related to support inquiries. Document clustering techniques can be used to group together similar documents. For example, when a support center receives a set of documents, it can extract keywords from the documents. Documents that are associated with similar keywords can be grouped together to generate clusters of documents.

SUMMARY

One or more aspects of the present disclosure can provide one or more of the following advantages. Documents distributed across numerous support channels (e.g., an online forum channel, a knowledge base channel, and so forth) are grouped together in clusters using unsupervised clustering techniques. Generally, a channel includes a pathway of communication through which information is transmitted and/or a site on a network wherein information is stored.

Systems and the methods described herein can be configured to identify documents that relate to a common support topic and are associated with disparate support channels. A system consistent with this disclosure implements unsupervised clustering techniques to cluster and to link these documents across the support channels. By linking the documents across the support channels, the system generates cross-channel support recommendations for a support inquiry.

In one aspect of the present disclosure, a computer-implemented method includes receiving, by one or more computer systems, first information from a first channel and second information from a second channel; merging the first information with the second information; applying an unsupervised clustering model to the merged information; and generating, based on results of the applying, a cross-channel cluster, the cross-channel cluster comprising (i) a portion of the first information associated with a subject matter, and (ii) a portion of the second information associated with the subject matter.

Implementations of the disclosure may include one or more of the following features. In some implementations, the method further includes applying a supervised labeling model to identify a label for the cross-channel cluster. The method may also include receiving, by the one or more computer systems, a request for information; and applying the supervised labeling model to the request for information to determine a label for the request.

In other implementations, the method includes determining that a confidence level for a relevance of information in the cross-channel cluster is less than a threshold level; and generating a message that identifies information in the cross-channel cluster that is likely to address the request for information. The method may also include identifying that the cross-channel cluster includes information that is relevant to the request for information, when a confidence level for a relevance of the relevant information in the cross-channel cluster exceeds a threshold confidence level; ranking the relevant information associated with the cross-channel cluster; and generating, based on the ranking, a response to the request, with the response comprising at least a portion of the ranked information.

In still other implementations, the method includes identifying a correspondence between the label for the request and a label for the cross-channel cluster; ranking information associated with the cross-channel cluster; and generating, based on the ranking, a response to the request, with the response comprising at least a portion of the ranked information. In some implementations, the first channel comprises one of an electronic mail channel, an online forum channel, an online help center channel, or an instant messaging channel, and wherein the second channel is different from the first channel and comprises one of an electronic mail channel, an online forum channel, an online help center channel, or an instant messaging channel.

In other implementations, the method includes generating a link between the information associated with the first channel in the plurality of channels and the information associated with the second channel in the plurality of channels. The method may also include, in response to a request, selecting, from the cross-channel cluster, information items relevant to the request.

In another aspect of the disclosure, a computer-implemented method includes receiving, by one or more computer systems, first information from a first channel in a plurality of channels and second information from a second channel in the plurality of channels; generating a first cluster of information items for the first channel in the plurality of channels, with the information items in the first cluster associated with similar topics; applying a supervised labeling model to generate a first label for the first cluster, with the first label indicative of the topics associated with the items of information in the first cluster; generating a second cluster of information items for the second channel in the plurality of channels, with the information items in the second cluster associated with similar topics; applying the supervised labeling model to generate a second label for the second cluster, with the second label indicative of the topics associated with the items of information in the second cluster; identifying a correspondence between the first label for the first cluster and the second label for the second cluster; merging the first cluster of information with the second cluster of information; and in response to a request, selecting information items relevant to the request using the merged first and second clusters. Implementations of this aspect of the present disclosure can include one or more of the foregoing features.

In still another aspect of the disclosure, a computer-implemented method includes accessing a first cluster of a first plurality of resources belonging to a first channel in a plurality of channels, with each resource in the first cluster associated with a topic, with the first channel comprising one or more an electronic mail (e-mail) channel, an online forum channel, an online help center channel, an instant messaging channel, and a knowledge base channel, and with a resource comprising one or more of text information, a document, a message, a web forum request, and a support inquiry; accessing a second cluster of a second plurality of resources belonging to a second channel in the plurality of channels, with each resource in the second cluster associated with a topic; for each resource in the first plurality of resources and in the second plurality of resources: applying an unsupervised clustering model to the resource; and assigning, based on the applying, the resource to a cross-channel cluster from a plurality of cross-channel clusters, with the cross-channel cluster including other resources associated with topics that are similar to a topic associated with the assigned resource; receiving a request for resources associated with a topic; determining a correspondence between (a) the topic associated with the request for resources, and (b) at least one of the cross-channel clusters; selecting one or more resources included in a cross-channel cluster that corresponds to the topic associated with the request; and sending the selected one or more resources to a computing device initiating the request. Implementations of this aspect of the present disclosure can include one or more of the foregoing features.

In yet another aspect of the disclosure, one or more machine-readable media are configured to store instructions that are executable by one or more processing devices to perform operations including sending a request for information; and receiving one or more resources included in a cross-channel cluster, with each resource corresponding to a topic associated with the request, wherein the cross-channel cluster comprises (i) a portion of first information from a first channel, the portion of first information associated with the topic, and (ii) a portion of second information from a second, different channel, the portion of second information associated with the topic. Implementations of this aspect of the present disclosure can include one or more of the foregoing features.

In another aspect of the disclosure, one or more machine-readable media are configured to store instructions that are executable by one or more processing devices to perform operations including receiving, by one or more computer systems, first information from a first channel and second information from a second channel; merging the first information with the second information; applying an unsupervised clustering model to the merged information; and generating, based on results of the applying, a cross-channel cluster, the cross-channel cluster comprising (i) a portion of the first information associated with a subject matter, and (ii) a portion of the second information associated with the subject matter. Implementations of this aspect of the present disclosure can include one or more of the foregoing features.

In still another aspect of the disclosure, an electronic system includes one or more processing devices; and one or more machine-readable media configured to store instructions that are executable by the one or more processing devices to perform operations including: receiving, by one or more computer systems, first information from a first channel and second information from a second channel; merging the first information with the second information; applying an unsupervised clustering model to the merged information; and generating, based on results of the applying, a cross-channel cluster, the cross-channel cluster comprising (i) a portion of the first information associated with a subject matter, and (ii) a portion of the second information associated with the subject matter. Implementations of this aspect of the present disclosure can include one or more of the foregoing features.

All or part of the foregoing can be implemented as a computer program product that includes instructions that are stored on one or more non-transitory machine-readable storage media, and that are executable on one or more processing devices. All or part of the foregoing can be implemented as an apparatus, method, or electronic system that can include one or more processing devices and memory to store executable instructions to implement the stated functions.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

In an example, a system consistent with this disclosure implements an unsupervised clustering model across numerous channels. The clustering model is unsupervised in that documents are clustered without the need to train the system to cluster the documents based on a manual review of a set of training documents. "Using the implementation of the unsupervised clustering model, the system can generate cross-channel clusters of information, including documents. The terms documents and resources are used interchangeably herein and refer to any item of information. Documents include, but are not limited to, text information, documents, messages (e.g., transcribed voice, electronic mail, and so forth), web forum requests, support inquiries, and so forth. Generally, cross-channel clusters can be also referred to as clusters.

In an example, clusters include documents associated with numerous, different channels, including, e.g., an electronic mail (e-mail) channel, an online forum channel, an online help center channel, an instant messaging channel, a knowledge base channel (e.g., an online knowledge base), and so forth. When the channels are implemented in a support center environment, these channels can be collectively referred to as support channels.

Figure 3A:
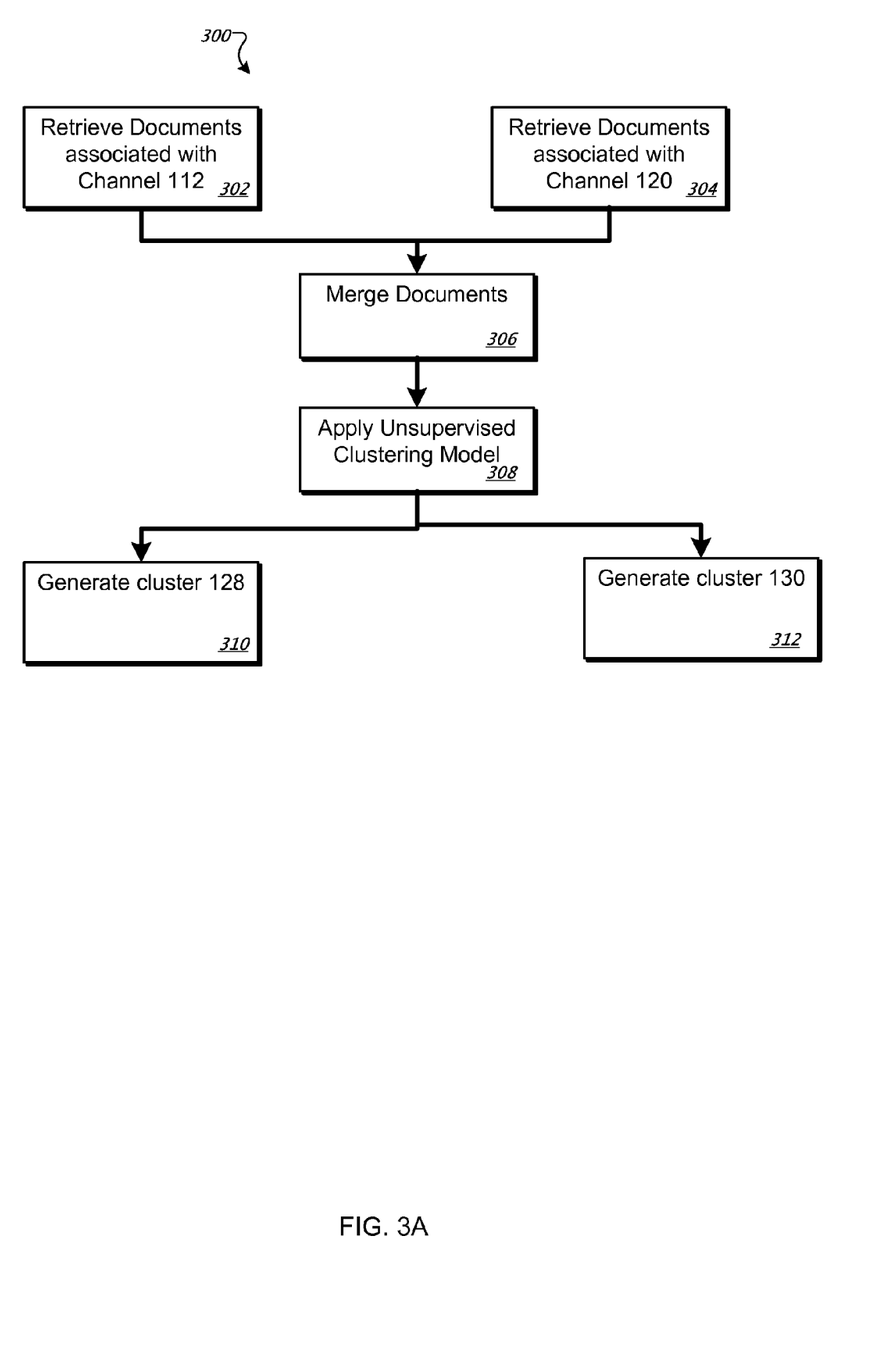
FIG. 3A is a flowchart of a process for generating cross-channel clusters by clustering together cross-channel documents.

In an example, cross-channel clusters can be generated from cross-channel documents, as described in further detail with regard to FIG. 3A. Generally, cross-channel documents include documents associated with various, different channels. In this example, cross-channel clusters can be generated by performing clustering on the cross-channel documents.

Figure 3B:
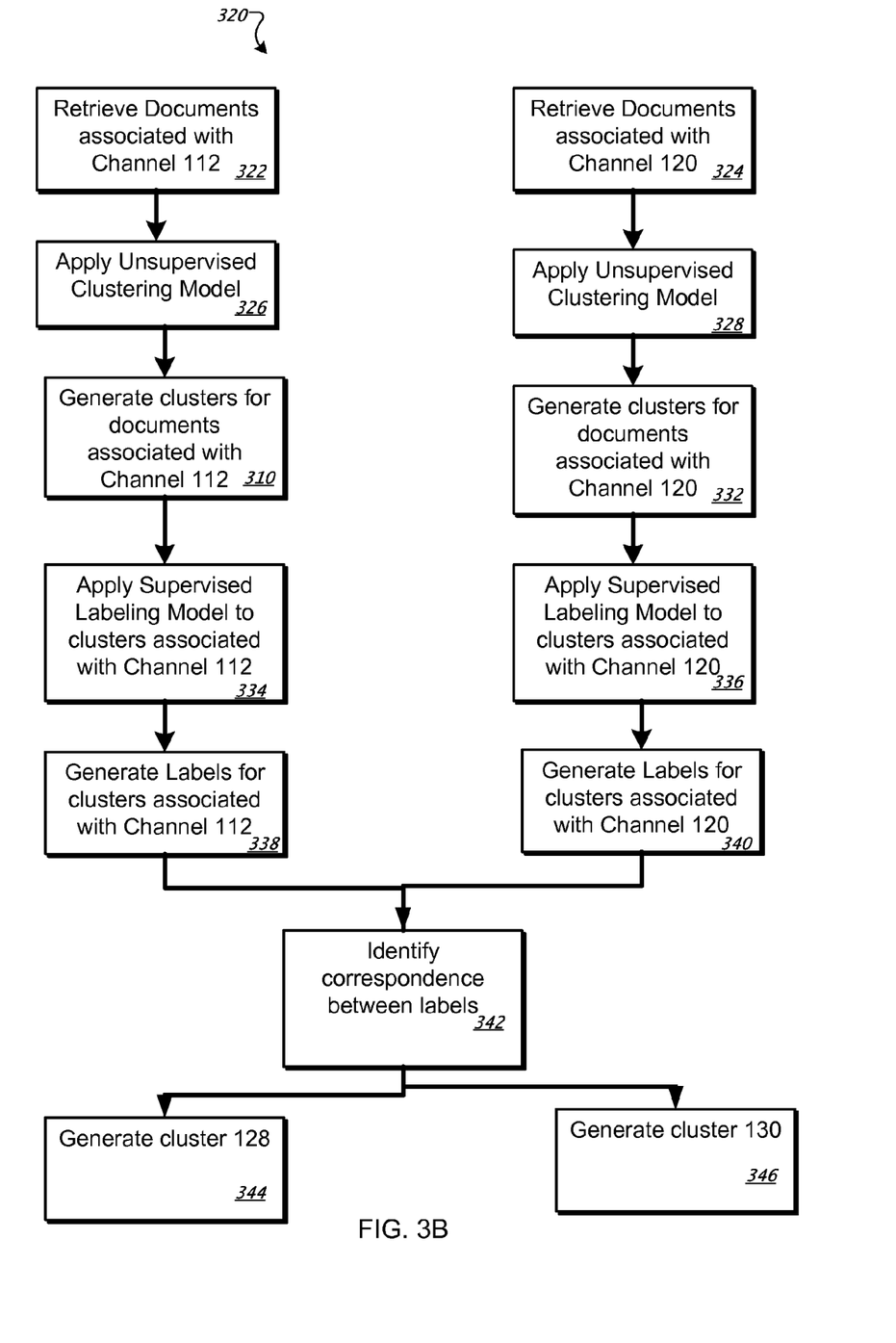
FIG. 3B is a flowchart of a process for generating cross-channel clusters from clusters that are related to a particular channel.

In another example, cross-channel clusters can be generated by a) clustering together documents for an individual channel and b) merging together clusters associated with similar topics from across the various individual channels, as described in further detail with regard to FIG. 3B. In particular, while the merged clusters are associated with different channels, the merged clusters may be associated with a similar topic or subject matter. To determine the topic of a cluster, the system can implement a labeling model, as described in further detail below. In the example of cross-channel clusters being generated from cross-channel documents, the cross-channel clusters may not be labeled because clustering is performed on the cross-channel documents, as opposed to merging together various clusters.

In the example of cross-channel clusters being generated by merging together clusters associated with various channels, following a clustering of the documents from the multiple channels, the system implements a supervised data classification model (referred to hereinafter as a labeling model)

to label the clusters with information indicative of an underlying topic associated with the clusters. The labeling model is supervised in that the model uses a set of training documents that have been manually reviewed and labeled. In particular, the documents can be manually associated with a label, including, e.g., data specifying a type of customer service issue and/or a type of topic associated with the document. The labeled documents are used as training data for the labeling model to recognize the labels in other, non-labeled documents in other non-labeled clusters. In an example, the labeling model selects a label associated with one of the documents in a cluster as the label for the cluster. In this example, the selected label can be the label that is associated with more documents in the cluster, relative to other labels associated with other documents in the cluster.

In an example, the labeling model determines which unlabeled documents should be associated with which labels. The unlabeled documents may be included in a cluster of documents, and the cluster may also be unlabeled. In this example, the labeling model determines a label for individual documents in the cluster. Based on the labels associated with the individual documents in the cluster, the system determines an appropriate label for the cluster as a whole.

In an example, a customer submits a support inquiry via e-mail to a support center. A help center article and support forum post may be responsive to the topic of the customer's support inquiry. In this example, the support inquiry is received by the support center through a particular support channel (e.g., an e-mail support channel) and the responsive documents (e.g., the help center article and the support forum post) are associated with different support channels (e.g., an online help center channel and an online forum channel). The system can be configured to identify the help center article and/or the support forum post as responsive to the customer's support inquiry, for example, even though these items are associated with a different channel.

In particular, the system collects documents from multiple support channels and executes the unsupervised clustering model to generate clusters of documents. Referring back to the foregoing example of the help center article and the support forum post, the system can determine that these documents are of a similar subject matter through the execution of the unsupervised clustering model that generates a cluster including the help center article and the support forum post.

In some examples, the system can be configured to execute the supervised labeling model to generate labels for the clusters (labeled clusters). The labels can identify a particular topic (e.g., customer support issues related to an email application, customer support issues related to a mobile application, or another topic) represented by individual documents in a cluster. Through a labeled cluster, the system can identify documents (e.g., help center articles, support forums posts, and so forth) across numerous support channels that are responsive to support inquiries (e.g., incoming support e-mails).

In the foregoing example of the cluster that includes the help center article and/or the support forum post, the cluster can be associated with a label specifying the underlying support topic associated with the help center article and/or the support forum post. In this example, by determining a correspondence (e.g., a similarity, a sameness, or a match) between the topic of the support inquiry and the label of the cluster, the system can determine that the help center article and/or the support forum post may be responsive to the support inquiry of the customer.

In some examples, the system can be configured to generate a link between information associated with one support channel and information associated with another support channel, based on a correspondence between information in the channels as determined by the clustering and/or the labeling models described herein. A link can include a pointer or other data structure that provides a reference to information. In the foregoing example, the system can generate a link between the help center article and the support forum post. Through the clusters and/or the links, the system provides cross-channel information for a support inquiry.

Figure 1:
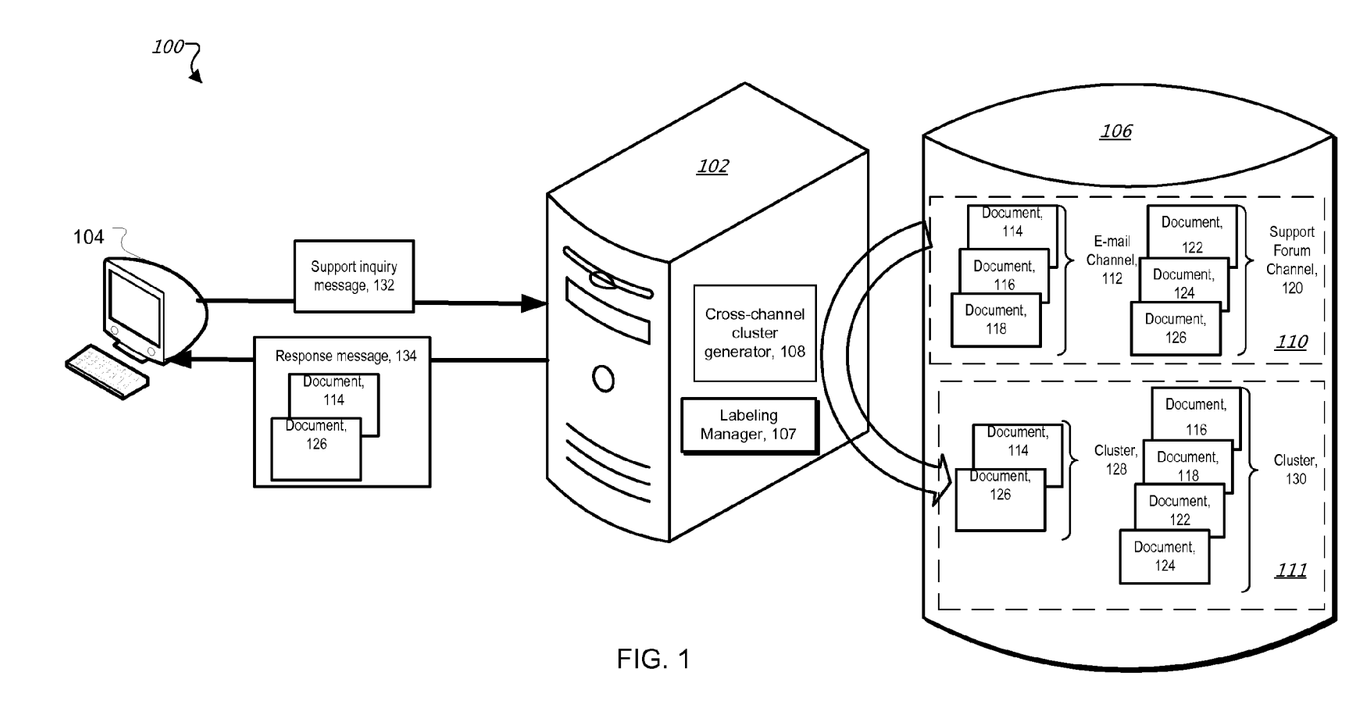
FIG. 1 is a block diagram of a system for clustering and labeling documents.

FIG. 1 is a block diagram of an example system 100 for clustering and labeling documents across numerous channels. System 100 can include server 102, client device 104 and data repository 106. Server 102 can include cross-channel cluster generator 108, which can be configured to generate clusters of similar documents from across numerous channels. Server 102 can include labeling manager 107, which can be configured to generate a label for the clusters, for example, based on labels of the individual documents in the clusters.

In the example of FIG. 1, data repository 106 includes information 110 that includes documents 114, 116, and 118 from channel 112 and documents 122, 124, and 126 from channel 120. Data repository 106 can also include information 111 with clusters 128 and 130. Information 110 can include documents 114, 116, 118 that are associated with e-mail channel 112. Information 110 can include documents 122, 124, and 126 that are associated with support forum channel 120. In an example, documents 114, 116, 118, 122, 124 and 126 can include, e.g., one or more messages (e.g., transcribed voice, electronic mail, and so forth), web forum requests, support inquiries, and/or other documents.

Cross-channel cluster generator 108 can retrieve documents 114, 116, 118, 122, 124, and 126 from data repository 106. Cross-channel cluster generator 108 can execute an unsupervised clustering model to group together documents 114, 116, 118, 122, 124, and 126 into clusters of similar types of documents. In particular, cross-channel cluster generator 108 can execute an unsupervised clustering model that extracts keywords from documents 114, 116, 118, 122, 124, and 126. Cross-channel cluster generator 108 can generate clusters 128 and 130, for example, based on a similarity of the extracted keywords. Clusters 128 and 130 each include documents of a similar type, e.g., documents associated with similar topics. Generally, similar topics can include, e.g., topics that are related to each other. For example, a topic on "building a web page" can be similar to a topic "web page customization," at least because the two topics include the words "web page" and are therefore related.

In the example of FIG. 1, cluster 128 can include documents 114 and 126. In particular, based on a similarity of keywords included in documents 114 and 126, cross-channel cluster generator 108 can group documents 114 and 126 together in cluster 128. Using a similar process, cross-channel cluster generator 108 generates cluster 130 including documents 116, 118, 122, and 124. In some examples, labeling manager 107 executes a supervised labeling model to generate a label (not shown) for cluster 128 and another label (not shown) for cluster 130.

In the example of FIG. 1, client device 104 can send support inquiry message 132 to server 102. Using the labeling model described herein, labeling manager 107 assigns a label to support inquiry message 132. Cross-channel cluster generator 108 compares the label assigned to support inquiry message 132 to the labels associated with clusters 128 and 130. Using the comparison, cross-channel cluster generator 108 determines a correspondence between the label assigned to support inquiry message 132 and the label associated with cluster 128. On the basis of the determined correspondence with cluster 128, cross-channel cluster generator 108 determines that documents 114 and 126 are included in cluster 128 and are directed towards the topic of support inquiry message 132. Accordingly, cross-channel cluster generator 108 can generate response message 134, which can include documents 114 and 126 (or links to documents 114 and 116), in response to support inquiry message 132.

Figure 2:
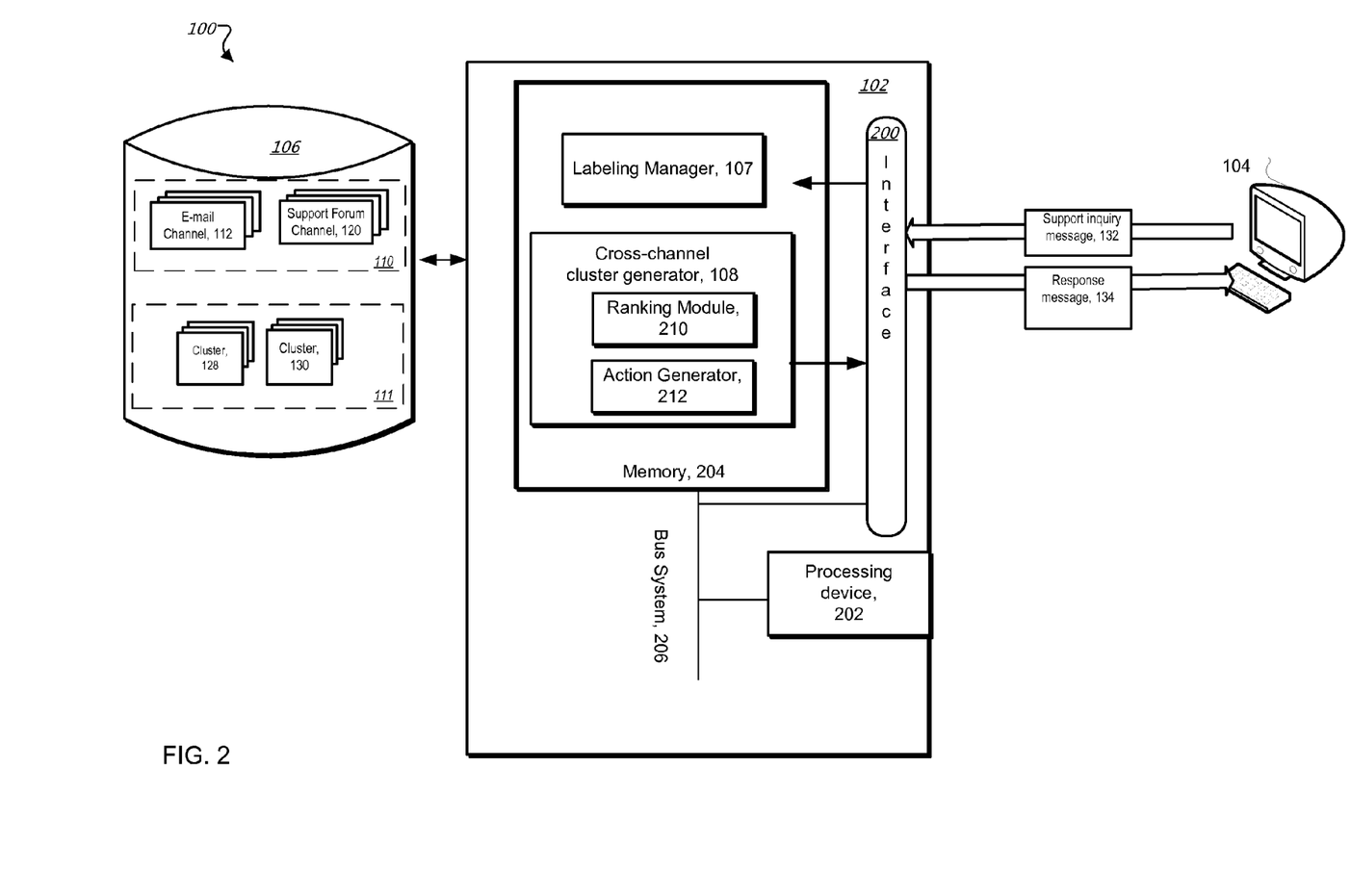
FIG. 2 is a block diagram of components of a system for clustering and labeling documents.

FIG. 2 is a block diagram of components of system 100. In FIG. 2, reference numbers 114, 116, 118, 122, 124, and 126 are not shown. Client device 104 can be any suitable computing device capable of receiving or taking input from, or on behalf of, a user and communicating over a network (not shown) with server 102 and/or with other client devices. For example, client device 104 can be a mobile device, a desktop computer, a laptop, a cell phone, a personal digital assistant (PDA), a server, an embedded computing systems, and the like. Server 102 can be any of a variety of computing devices capable of receiving data, such as a server, a distributed computing system, a desktop computer, a laptop, a cell phone, a rack-mounted server, and so forth. Server 102 can be a single server or a group of servers that are at a same location or at different locations.

As shown in FIG. 2, server 102 can include input/output (I/O) interface 200, which can facilitate communication with client 104. Server 102 can receive data from client device 104 via I/O interface 200. I/O interface 200 can be any type of interface capable of receiving data over a network, such as an Ethernet interface, a wireless networking interface, a fiber-optic networking interface, a modem, and the like. Server 102 can also include a processing device 202 and memory 204. A bus system 206, including, for example, a data bus and a motherboard, can be used to establish and to control data communication between the components of server 102.

Processing device 202 can include one or more microprocessors. Generally speaking, processing device 202 can include any appropriate processor and/or logic that is capable of receiving and storing data, and capable of communicating over a network (not shown). Memory 204 can include a hard drive and a random access memory storage device, such as a dynamic random access memory, or other types of non-transitory machine-readable storage devices. As shown in FIG. 2, memory 204 stores computer programs that are executable by processing device 202. Among these computer programs are labeling manager 107, cross-channel cluster generator 108, ranking module 210, and action generator 212, each of which are described in further detail below. Although a number of discrete modules are identified in connection with FIGS. 1 and 2, the functionality of these modules can overlap and/or exist in a fewer or a greater number of modules residing in one or more processing devices, which may be geographically dispersed.

Labeling manager 107 can be configured to generate a label for a cluster of documents using the labeling model. Labeling manager 107 can also be configured to receive from a user of system 100 information specifying a label for a particular cluster. In an example, a user manually reviews documents in clusters 128 and 130. Using results of the review, a user determines appropriate labels for clusters 128 and 130 and sends to server 102 (e.g., via client device 104) information indicative of the labels for clusters 128 and 130.

Ranking module 210 is configured to generate a ranking of the documents included in a cluster, for example, based on a relevance of the documents to a support topic associated with support inquiry message 132. Ranking module 210 can be configured to execute a ranking model to rank the documents included in the cluster. In an example, the ranking model predicts a likelihood that a document will be selected by a customer service representative (CSR), based on a correspondence between words in support inquiry message 132 and words included in the document.

Action generator 212 can be configured to perform numerous types of actions, including, e.g., generating an automated response message, generating a CSR response message, generating links that cross-reference documents among multiple, support channels, and so forth, as described in further detail below. An automated response message can include cross-channel support recommendations, including, e.g., documents from numerous channels that are recommended for a consumer's review to address a customer support topic.

In an example, action generator 212 can be configured to generate an automated response message (e.g., response message 134) to customer support inquiries (e.g., support inquiry message 132). In this example, a customer support topic associated with support inquiry message 132 can be identified by labeling manager 107 using the supervised labeling model described herein. Labeling manager 107 associates support inquiry message 132 with a label including information indicative of the identified customer support topic. Using the identified customer support topic included in the label, action generator 212 determines a cluster (e.g., cluster 128 or cluster 130) including documents that are responsive to the identified customer support topic.

In an example, action generator 212 compares the label associated with support inquiry message 132 to the labels associated with clusters 128 and 130. By determining a correspondence between the label associated with support inquiry message 132 and a label associated with cluster 128 or cluster 130, action generator 212 identifies a cluster including documents that are responsive to support inquiry message 132.

In the example of FIGS. 1 and 2, action generator 212 can identify cluster 128 as including documents that are responsive to support inquiry message 132. In this example, ranking module 210 can be configured to rank documents 114 and 126 included in cluster 128, for example, using the ranking model described herein. Action generator 212 can be configured to generate response message 134 including documents 114 and 126 (or a portion of the documents included in cluster 128) that address the identified customer support topic. In particular, response message 134 can include documents related to (or links to documents related to) help articles, user forum posts, and so forth.

In an example, response message 134 can be automatically generated by action generator 212, without a manual review of the relevance of the documents included in response message 134. In this example, because the documents included in response message 134 are not manually reviewed for relevance, action generator 212 can generate response message 134 when action generator 212 can identify (with a confidence level above a threshold level) a cluster that includes relevant documents.

In this example, the confidence level includes information indicative of a similarity between inquiry message 132 and a document included in response message 134. In an example, the confidence level includes a ratio of (i) a number of terms included in both inquiry message 132 and the document included in response message 134, and (ii) a total number of terms in the document included in response message 134. In this example, the foregoing ratio is indicative of the similarity between inquiry message 132 and the document included in response message 134.

In another example, a confidence level may include a value of 95%, which is indicative of a high degree of similarity between inquiry message 132 and the document included in response message 134. In this example, if the confidence level includes the above-described ratio, then a 95% confidence level specifies that 95% of the terms in the document included in response message 134 are also included in inquiry message 132.

A confidence level may also include a value of 50%, which is indicative of a lesser degree of similarity between inquiry message 132 and the document included in response message 134.

Additionally, a threshold level includes a minimum confidence level of a document in order for the document to be included in response message 134. In an example, a threshold level of 90% indicates that documents associated with a confidence level of 90% or higher may be included in response message 134.

When action generator 212 is unable to identify relevant documents at a confidence level above the threshold level, action generator 212 can also be configured to generate a CSR message (not shown). A CSR message provides a CSR with cross-channel support recommendations, including, e.g., a list of documents that are likely to address a customer support topic. In an example, by generating a CSR message, action generator 212 can select documents from a cluster having a confidence level that is above the threshold level. In an example, action generator 212 can select all documents having a confidence level above the threshold level. In another example, action generator 212 can select a subset of the documents having a confidence level above the threshold level. In this example, action generator 212 can select a predefined number of documents having a confidence level above the threshold level, including, e.g., the top five documents with highest confidence levels in relation to other document, the top ten documents with highest confidence levels in relation to other document, and so forth.

Action generator 212 can be configured to select documents based on the confidence level of the documents, because a CSR's manual review of the documents provides an additional level of verification of the documents' relevance, e.g., prior to the documents being sent to a customer.

Action generator 212 can also be configured to generate links that reference documents across multiple support channels, e.g., following an identification of the documents, as being directed towards a common support topic using the clustering and/or labeling models described herein. In an example, action generator 212 can generate a link between a user forum post (e.g., stored in data repository 106) associated with an online forum channel and a related help center article (e.g., stored in data repository 106) associated with an online help center channel. Referring back to FIG. 1, documents 114 and 126 are related to each other and are grouped in the same cluster, namely, cluster 128. In this example, action generator 212 can generate and can insert a link into document 114 that points to document 126, and vice versa.

FIG. 3A is a flowchart of a process for generating cross-channel clusters by clustering together cross-channel documents. In operation, cross-channel cluster generator 108 can retrieve (302) from data repository 106 documents 114, 116, and 118 (FIG. 1) associated with channel 112. Cross-channel cluster generator 108 can also retrieve (304) from data repository 106 documents 122, 124, and 126 associated with channel 120. Cross-channel cluster generator 108 can merge (306) together documents 114, 116, 118, 122, 124, and 126 into a single group of documents. Cross-channel cluster generator 108 can apply (308) an unsupervised clustering model to documents 114, 116, 118, 122, 124, and 126. Based on an application of the unsupervised clustering model, cross-channel cluster generator 108 can generate (310) cluster 128 and generates (312) cluster 130.

In the example of FIG. 3A, because the unsupervised clustering model can be applied to cross-channel documents (e.g., documents associated with channel 112 and documents associated with channel 120), cross-channel clusters 128 and 130 can be generated without the use of a supervised labeling model. However, when the unsupervised clustering model can be applied to documents for a particular channel, rather than to cross-channel documents, the supervised labeling model can be used to match together clusters that are associated with a similar label. In particular, unsupervised clustering can be executed separately for each channel of documents, and then the clusters are labeled with customer issues using predefined labels (e.g., taxonomy of issues) for all channels. In this example, correlation between channels can be performed via a match of the labels, as described in further detail below.

FIG. 3B is a flowchart of a process 320 for generating cross-channel clusters from clusters that are related to a particular channel. In operation, cross-channel cluster generator 108 can retrieve (322) from data repository 106 documents 114, 116, and 118 (FIG. 1) associated with channel 112. Cross-channel cluster generator 108 can also retrieve (324) from data repository 106 documents 122, 124, and 126 associated with channel 120. Cross-channel cluster generator 108 can apply (326) an unsupervised clustering model to documents 114, 116, 118 associated with channel 112. Cross-channel cluster generator 108 can also apply (328) an unsupervised clustering model to documents 122, 124, and 126 associated with channel 120.

On the basis of the application of the unsupervised clustering model, cross-channel cluster generator 108 can generate (330) one or more clusters of documents associated with channel 112 and can generate (332) one or more clusters of documents associated with channel 120.

Labeling manager 107 can apply (334) the supervised labeling model to the one or more clusters of documents associated with channel 112 and can apply (336) the supervised labeling model the one or more clusters of documents associated with channel 120. Using the application of the labeling model, labeling manager 107 can also generate (338) labels for the various clusters of documents associated with channel 112 and can generate (340) labels for the various clusters of documents associated with channel 120. Cross-channel cluster generator 108 can identify (342) a correspondence between the labels of the various clusters of documents associated with channels 112 and 120. By merging together clusters that have corresponding labels and that are associated with channels 112 and 120, cross-channel cluster generator 108 can generate (344) cross-channel cluster 128 and can generate (346) cross-channel cluster 130.

While the actions of FIGS. 3A and 3B are described with reference to two channels (e.g., channels 112 and 120), the actions of FIGS. 3A and 3B can be implemented across numerous channels (e.g., five channels, ten channels, twenty channels, one hundred channels, and so forth.

Figure 4:
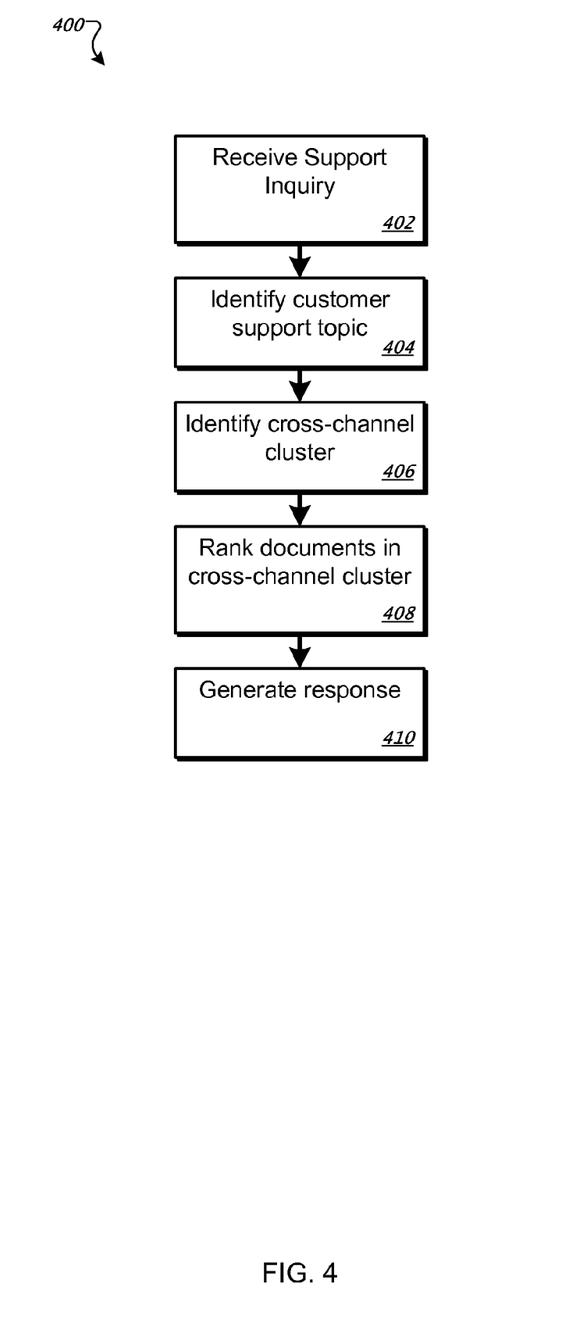
FIG. 4 is a flowchart of a process for identifying documents across multiple channels that are responsive to a support inquiry.

FIG. 4 is a flowchart of a process 400 for identifying documents across multiple channels that are responsive to a support inquiry request. In operation, labeling manager 107 can receive (402) support inquiry message 132 (FIGS. 1, 2). In response, labeling manager 107 can identify (404) a support topic associated with support inquiry message 132, for example, by applying the supervised labeling model to support inquiry message 132.

Cross-channel cluster generator 108 can identify (406) a cluster that includes documents that are responsive to the identified support topic. In an example, cross-channel cluster generator 108 can identify a cluster by comparing the label associated with support inquiry message 132 to the labels associated with clusters 128, 130. Based on the comparison, cross-channel cluster generator 108 can determine (not shown) a correspondence between the label associated with support inquiry message 132 and a label associated with one of clusters 128 and 130.

Ranking module 210 can rank (408) the documents included in the identified cluster according to a relevance of the documents to the identified support topic. Action generator 212 can generate (410) an action, including, e.g., a response message, a CSR response message, links that cross-reference information among multiple, support channels, and so forth.

In an example, action generator 212 can be configured to select a portion of the documents included in an identified cluster based on a ranking value associated with the individual documents. Based on the selected portion of documents, action generator 212 can generate the action, for example, by formatting and/or compiling the selected portion of documents in a manner that is readable by a user of the system.

In particular, action generator 212 can select a pre-defined number of documents that have been identified by ranking module 210 as being the most relevant to a support topic. In this example, action generator 212 can be configured to select the top five or ten documents that have been ranked most relevant to a support topic by ranking module 210. In another example, action generator 212 can be configured to select a pre-defined percentage of relevant documents, including, e.g., the top 3%, 5% or 15% percent of most relevant documents. In yet another example, action generator 212 can be configured to select documents that are less relevant but more understandable (e.g., the documents are in a language of a user of the system).

Using the techniques described herein, a system uses an unsupervised clustering model to generate clusters of similar types of information from information that is associated with numerous channels. The system also uses a supervised labeling model to associate labels with the clusters. By labeling the clusters, the system generates cross-channel support recommendations for a support inquiry.

Figure 5:
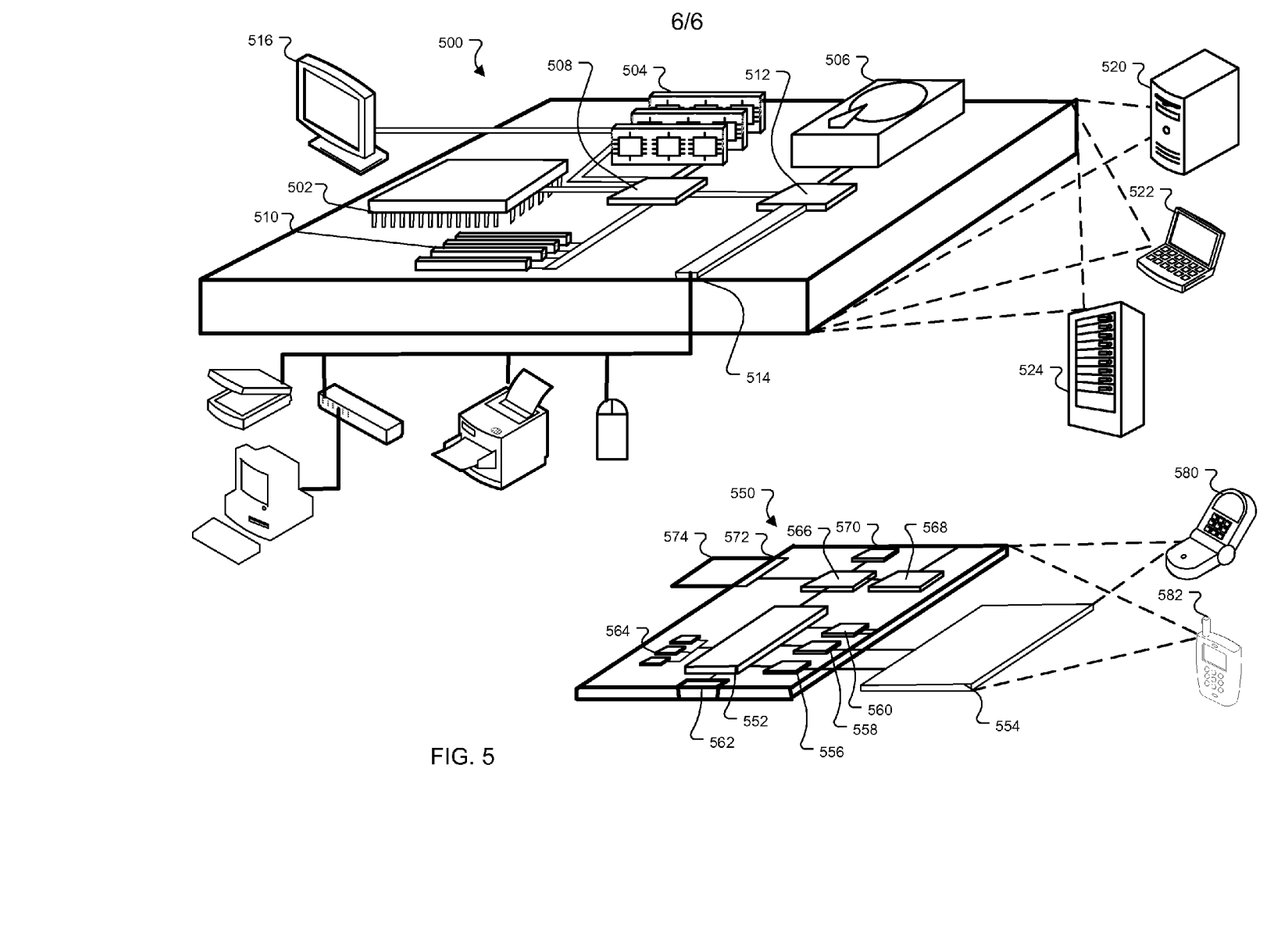
FIG. 5 shows an example of a computer device and a mobile computer device that can be used to implement techniques described herein.

FIG. 5 shows an example of computer device 500 and mobile computer device 550, which can be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 500 includes processor 502, memory 504, storage device 506, high-speed interface 508 connecting to memory 504 and high-speed expansion ports 510, and low speed interface 512 connecting to low speed bus 514 and storage device 506. Each of components 502, 504, 506, 508, 510, and 512, are interconnected using various busses, and can be mounted on a common motherboard or in other manners as appropriate. Processor 502 can process instructions for execution within computing device 500, including instructions stored in memory 504 or on storage device 506 to display graphical information for a GUI on an external input/output device, such as display 516 coupled to high speed interface 508. In other implementations, multiple processors and/or multiple buses can be used, as appropriate, along with multiple memories and types of memory. Also, multiple computing devices 500 can be connected, with each device providing portions of the necessary operations (e.g., as a server bank, a group of blade servers, or a multi-processor system).

Memory 504 stores information within computing device 500. In one implementation, memory 504 is a volatile memory unit or units. In another implementation, memory 504 is a non-volatile memory unit or units. Memory 504 can also be another form of computer-readable medium, such as a magnetic or optical disk.

Storage device 506 is capable of providing mass storage for computing device 500. In one implementation, storage device 506 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as memory 504, storage device 506, memory on processor 502, and so forth.

High-speed controller 508 manages bandwidth-intensive operations for computing device 500, while low speed controller 512 manages lower bandwidth-intensive operations. Such allocation of functions is an example only. In one implementation, high-speed controller 508 is coupled to memory 504, display 516 (e.g., through a graphics processor or accelerator), and to high-speed expansion ports 510, which can accept various expansion cards (not shown). In the implementation, low-speed controller 512 is coupled to storage device 506 and low-speed expansion port 514. The low-speed expansion port, which can include various communication ports (e.g., USB, Bluetooth®, Ethernet, wireless Ethernet), can be coupled to one or more input/output devices, such as a keyboard, a pointing device, a scanner, or a networking device such as a switch or router, e.g., through a network adapter.

Computing device 500 can be implemented in a number of different forms, as shown in the figure. For example, it can be implemented as standard server 520, or multiple times in a group of such servers. It can also be implemented as part of rack server system 524. In addition or as an alternative, it can be implemented in a personal computer such as laptop computer 522. In some examples, components from computing device 500 can be combined with other components in a mobile device (not shown), such as device 550. Each of such devices can contain one or more of computing device 500, 550, and an entire system can be made up of multiple computing devices 500, 550 communicating with each other.

Computing device 550 includes processor 552, memory 564, an input/output device such as display 554, communication interface 566, and transceiver 568, among other components. Device 550 can also be provided with a storage device, such as a microdrive or other device, to provide additional storage. Each of components 550, 552, 564, 554, 566, and 568, are interconnected using various buses, and several of the components can be mounted on a common motherboard or in other manners as appropriate.

Processor 552 can execute instructions within computing device 550, including instructions stored in memory 564. The processor can be implemented as a chipset of chips that include separate and multiple analog and digital processors. The processor can provide, for example, for coordination of the other components of device 550, such as control of user interfaces, applications run by device 550, and wireless communication by device 550.

Processor 552 can communicate with a user through control interface 558 and display interface 556 coupled to display 554. Display 554 can be, for example, a TFT LCD (Thin-Film-Transistor Liquid Crystal Display) or an OLED (Organic Light Emitting Diode) display, or other appropriate display technology. Display interface 556 can comprise appropriate circuitry for driving display 554 to present graphical and other information to a user. Control interface 558 can receive commands from a user and convert them for submission to processor 552. In addition, external interface 562 can communicate with processor 552, so as to enable near area communication of device 550 with other devices. External interface 562 can provide, for example, for wired communication in some implementations, or for wireless communication in other implementations, and multiple interfaces can also be used.

Memory 564 stores information within computing device 550. Memory 564 can be implemented as one or more of a computer-readable medium or media, a volatile memory unit or units, or a non-volatile memory unit or units. Expansion memory 574 can also be provided and connected to device 550 through expansion interface 572, which can include, for example, a SIMM (Single In Line Memory Module) card interface. Such expansion memory 574 can provide extra storage space for device 550, or can also store applications or other information for device 550. Specifically, expansion memory 574 can include instructions to carry out or supplement the processes described above, and can include secure information also. Thus, for example, expansion memory 574 can be provide as a security module for device 550, and can be programmed with instructions that permit secure use of device 550. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as memory 564, expansion memory 574, memory on processor 552, that can be received, for example, over transceiver 568 or external interface 562.

Device 550 can communicate wirelessly through communication interface 566, which can include digital signal processing circuitry where necessary. Communication interface 566 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 568. In addition, short-range communication can occur, such as using a Bluetooth, WiFi, or other such transceiver (not shown). In addition, GPS (Global Positioning System) receiver module 570 can provide additional navigation- and location-related wireless data to device 550, which can be used as appropriate by applications running on device 550.

Device 550 can also communicate audibly using audio codec 560, which can receive spoken information from a user and convert it to usable digital information. Audio codec 560 can likewise generate audible sound for a user, such as through a speaker, e.g., in a handset of device 550. Such sound can include sound from voice telephone calls, can include recorded sound (e.g., voice messages, music files, and so forth) and can also include sound generated by applications operating on device 550.

Computing device 550 can be implemented in a number of different forms, as shown in the figure. For example, it can be implemented as cellular telephone 580. It can also be implemented as part of smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the processes and techniques described herein.

In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

Although a few implementations have been described in detail above, other modifications are possible. Moreover, other mechanisms for editing voice can be used. In addition, the logic flows depicted in the figures do not require the particular order shown, or sequential order, to achieve desirable results. Other steps can be provided, or steps can be eliminated, from the described flows, and other components can be added to, or removed from, the described systems. Accordingly, other embodiments not specifically described herein are also within the scope of the following claims.

What is claimed is:

1. A computer-implemented method comprising:
   receiving, by one or more computer systems, first information from a first type of channel and second information from a second type of channel, with the first type of channel differing from the second type of channel;
   merging the first information received from the first type of channel with the second information received from the second type of channel that differs from the first type of channel;
   applying an unsupervised clustering model to the merged information; and
   generating, based on results of the applying, a cross-channel cluster, the cross-channel cluster comprising (i) a portion of the first information received from the first type of channel associated with a subject matter, and (ii) a portion of the second information received from the second type of channel that differs from the first type of channel associated with the subject matter, wherein the cross-channel cluster comprises a cluster of information that is received from at least two different types of channels.

2. The computer-implemented method of claim 1, further comprising:
   applying a supervised labeling model to identify a label for the cross-channel cluster.

3. The computer-implemented method of claim 2, further comprising:
   receiving, by the one or more computer systems, a request for information; and
   applying the supervised labeling model to the request for information to determine a label for the request.

4. The computer-implemented method of claim 3, further comprising:
   determining that a confidence level for a relevance of information in the cross-channel cluster is less than a threshold level; and
   generating a message that identifies information in the cross-channel cluster that is likely to address the request for information.

5. The computer-implemented method of claim 3, further comprising:
   identifying that the cross-channel cluster includes information that is relevant to the request for information, when a confidence level for a relevance of the relevant information in the cross-channel cluster exceeds a threshold confidence level;
   ranking the relevant information associated with the cross-channel cluster; and
   generating, based on the ranking, a response to the request, with the response comprising at least a portion of the ranked information.

6. The computer-implemented method of claim 3, further comprising:
   identifying a correspondence between the label for the request and a label for the cross-channel cluster;
   ranking information associated with the cross-channel cluster; and
   generating, based on the ranking, a response to the request, with the response comprising at least a portion of the ranked information.

7. The computer-implemented method of claim 1, wherein the first type of channel comprises one of an electronic mail channel, an online forum channel, an online help center channel, or an instant messaging channel, and wherein the second type of channel comprises one of an electronic mail channel, an online forum channel, an online help center channel, or an instant messaging channel.

8. The computer-implemented method of claim 1, further comprising:
   generating a link between the information associated with the first type of channel in the plurality of channels and the information associated with the second type of channel in the plurality of channels.

9. The computer-implemented method of claim 1, further comprising:
   in response to a request,
   selecting, from the cross-channel cluster, information items relevant to the request.

10. A computer-implemented method comprising:
    receiving, by one or more computer systems, first information from a first type of channel in a plurality of channels and second information from a second type of channel in the plurality of channels;
    generating a first cluster of information items for the first type of channel in the plurality of channels, with the information items in the first cluster associated with similar topics;
    applying a supervised labeling model to generate a first label for the first cluster, with the first label indicative of the topics associated with the items of information in the first cluster;
    generating a second cluster of information items for the second type of channel in the plurality of channels, with the information items in the second cluster associated with similar topics, with the first type of channel differing from the second type of channel;
    applying the supervised labeling model to generate a second label for the second cluster, with the second label indicative of the topics associated with the items of information in the second cluster;
    identifying a correspondence between the first label for the first cluster and the second label for the second cluster;
    merging the first cluster of information with the second cluster of information;
    generating, based on merging, a cross-channel cluster of information wherein the cross-channel cluster comprises a cluster of information that is received from at least two different types of channels; and in response to a request, selecting information items relevant to the request using the merged first and second clusters.

11. A computer-implemented method comprising:
accessing a first cluster of a first plurality of resources belonging to a first type of channel in a plurality of channels, with each resource in the first cluster associated with a topic, with the first type of channel comprising one or more an electronic mail (e-mail) channel, an online forum channel, an online help center channel, an instant messaging channel, and a knowledge base channel, and with a resource comprising one or more of text information, a document, a message, a web forum request, and a support inquiry;
accessing a second cluster of a second plurality of resources belonging to a second type of channel in the plurality of channels, with each resource in the second cluster associated with a topic;
for each resource in the first plurality of resources and in the second plurality of resources:
applying an unsupervised clustering model to the resource; and
assigning, based on the applying, the resource to a cross-channel cluster from a plurality of cross-channel clusters, with the cross-channel cluster including other resources associated with topics that are similar to a topic associated with the assigned resource, and with the cross-channel cluster comprising a cluster of information that is received from at least two different types of channels;
receiving a request for resources associated with a topic;
determining a correspondence between (a) the topic associated with the request for resources, and (b) at least one of the cross-channel clusters;
selecting one or more resources included in a cross-channel cluster that corresponds to the topic associated with the request; and
sending the selected one or more resources to a computing device initiating the request.

12. One or more machine-readable media configured to store instructions that are executable by one or more processing devices to perform operations comprising:
receiving first information from a first type of channel and second information from a second type of channel, with the first type of channel differing from the second type of channel;
merging the first information received from the first type of channel with the second information received from the second type of channel that differs from the first type of channel;
applying an unsupervised clustering model to the merged information; and
generating, based on results of the applying, a cross-channel cluster, the cross-channel cluster comprising (i) a portion of the first information received from the first type of channel associated with a subject matter, and (ii) a portion of the second information received from the second type of channel that differs from the first type of channel associated with the subject matter, wherein the cross-channel cluster comprises a cluster of information that is received from at least two different types of channels.

13. The one or more machine-readable of claim 12, wherein the operations further comprise:
applying a supervised labeling model to identify a label for the cross-channel cluster.

14. The one or more machine-readable of claim 13, wherein the operations further comprise:
receiving, by the one or more computer systems, a request for information; and
applying the supervised labeling model to the request for information to determine a label for the request.

15. The one or more machine-readable of claim 14, wherein the operations further comprise:
determining that a confidence level for a relevance of information in the cross-channel cluster is less than a threshold level; and
generating a message that identifies information in the cross-channel cluster that is likely to address the request for information.

16. An electronic system, comprising:
one or more processing devices; and
one or more machine-readable media configured to store instructions that are executable by the one or more processing devices to perform operations comprising:
receiving first information from a first type of channel and second information from a second type of channel, with the first type of channel differing from the second type of channel;
merging the first information received from the first type of channel with the second information received from the second type of channel that differs from the first type of channel;
applying an unsupervised clustering model to the merged information; and
generating, based on results of the applying, a cross-channel cluster, the cross-channel cluster comprising (i) a portion of the first information received from the first type of channel associated with a subject matter, and (ii) a portion of the second information received from the second type of channel that differs from the first type of channel associated with the subject matter, wherein the cross-channel cluster comprises a cluster of information that is received from at least two different types of channels.

17. The electronic system of claim 16, wherein the operations further comprise:
applying a supervised labeling model to identify a label for the cross-channel cluster.

18. The electronic system of claim 17, wherein the operations further comprise:
receiving, by the one or more computer systems, a request for information; and
applying the supervised labeling model to the request for information to determine a label for the request.

19. The electronic system of claim 18, wherein the operations further comprise:
determining that a confidence level for a relevance of information in the cross-channel cluster is less than a threshold level; and
generating a message that identifies information in the cross-channel cluster that is likely to address the request for information.

20. One or more machine-readable media configured to store instructions that are executable by one or more processing devices to perform operations comprising:
sending a request for information; and
receiving one or more resources included in a cross-channel cluster, with each resource corresponding to a topic associated with the request,
wherein the cross-channel cluster comprises (i) a portion of first information from a first type of channel, the portion of first information associated with the topic, and (ii) a portion of second information from a second type of channel that differs from the first type of channel, the portion of second information associated with the topic, wherein the cross-channel cluster comprises a cluster of information that is received from at least two different types of channels.

\* \* \* \* \*

UNITED STATES PATENT AND TRADEMARK OFFICE
CERTIFICATE OF CORRECTION

PATENT NO. : 8,543,577 B1
APPLICATION NO. : 13/038835
DATED : September 24, 2013
INVENTOR(S) : Aner Ben-Artzi et al.

It is certified that error appears in the above-identified patent and that said Letters Patent is hereby corrected as shown below:

Title Page 2, Column 1, line 15 item (56), under "Other Publications":

Delete "Contextual izing" and insert -- Contextualizing --, therefor.

In the Claims:

Column 16, line 65, at Claim 10:

Delete "information" and insert -- information, --, therefor.

Signed and Sealed this
Twentieth Day of May, 2014

Michelle K. Lee
*Deputy Director of the United States Patent and Trademark Office*